Figures 1, 2, 3, 4:
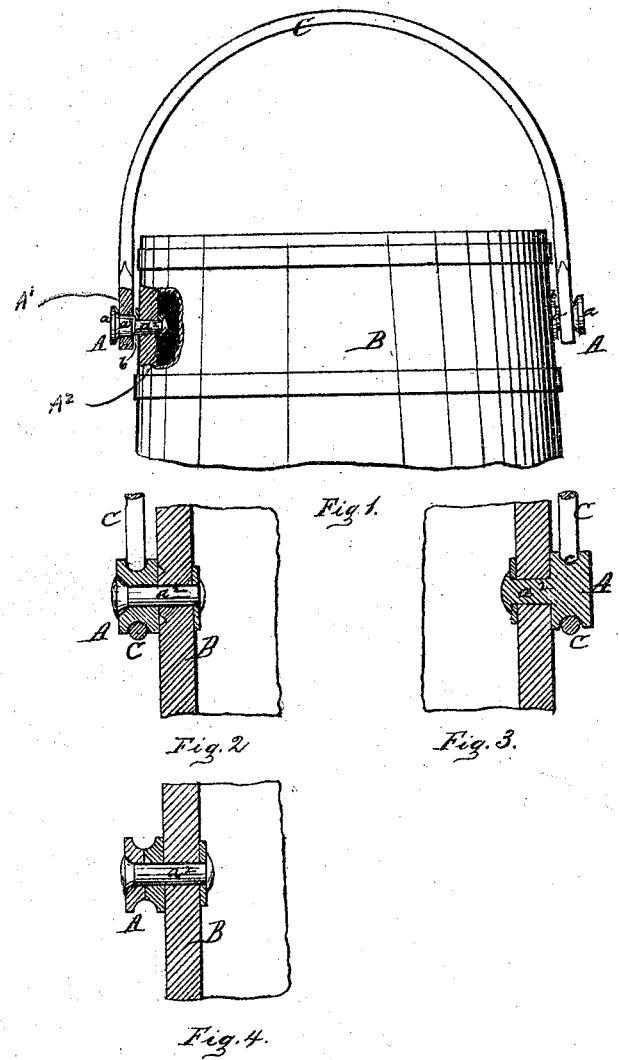

W. BROWN & C. STEVENS.

Improvement in Studs for Attaching Bails to Buckets.

No. 128,585. Patented July 2, 1872.

Witnesses:
Inventors:

UNITED STATES PATENT OFFICE.

WILLIAM BROWN AND CHARLES STEVENS, OF ST. LOUIS, MISSOURI.

IMPROVEMENT IN STUDS FOR ATTACHING BAILS TO BUCKETS.

Specification forming part of Letters Patent No. 128,585, dated July 2, 1872.

*To all whom it may concern:*

Be it known that we, WILLIAM BROWN and CHARLES STEVENS, of St. Louis, in the county of St. Louis and State of Missouri, have made certain new and useful Improved Ears for the Bails of Buckets and similar vessels; and we do hereby declare that the following is a full and true description thereof, reference being had to the accompanying drawing and to the letters of reference marked thereon.

The ordinary form of ears for securing bails or handles to well-buckets and similar vessels consists of a strap-hook. The hook or bent portion of said ears, owing to weakness from the manner of forging, and at the same time being the part exposed to the greatest strain, frequently break, and are rendered useless for their purpose. Also, the use of said forged strap-hooks as ears for bails are time-consuming in their make, and expensive in increasing the cost of the pail or bucket. The object of this invention, therefore, is to form a more cheap and substantial ear for pails, &c.; and the nature thereof relates in constructing the ear with a boss or hook for the reception of the bail or handle, and having an extension shank by which it is secured to the staves or vessel, and as now will more fully be described.

To enable those skilled in the art to make and use our said invention we will now more fully describe the same, referring to the accompanying—

Figure 1, as a part section and side elevation; to Figs. 2, 3, 4, as representing various modifications of our improvement.

The ear or boss A is constructed of cast, wrought, or malleable iron. It consists of a flange or rim, $a$, center shank, $a^1$, and extension shank, $a^2$. The extension shank passes through the stave of the bucket B, being properly riveted or bolted, a washer, $b$, being inserted between the stave and ear, and the bail C secured to the center shank $a^1$. (See Fig. 1.) The shank $a^2$ may be formed separate, so as to pass through a boss, A, having lugs, and secured to the bucket, as shown in Fig. 2.

By way of slight modifications, the ear A may be constructed of a single piece, having a circular groove, $c$, for the reception of the bail C, (see Fig. 3;) or formed of two cone-shaped pieces, the shank passing through. (See Fig. 4.) The shank may also be formed screw-threaded.

By the use of our improved bail-ear the bail can be hung nearer the top of the bucket, allowing it to tip and fill more readily. Also, the bucket can be repaired without interfering with the bail or ear, besides being simple, neat, and durable in construction, advantages readily apparent.

Having thus fully described our said invention, what we claim, and desire to secure by Letters Patent, is—

The ear A, consisting of the head $a$, cylindrical part $a^1$, reduced part $a^2$, and washers $b$ $b$, all constructed as described.

In testimony of said invention we have hereunto set our hands.

WILLIAM BROWN.
CHARLES STEVENS.

Witnesses:
WILLIAM H. HERTHEL,
ROBERT BURNS.